Aug. 26, 1958 A. C. WINTERHALTER 2,849,182
ANALOGUE COMPUTING AND PLOTTING DEVICE
Filed Oct. 13, 1954 3 Sheets-Sheet 1

(A) $\quad t_2 + t_3 = \dfrac{S_2}{V_2} + \dfrac{S_3}{V_3}$ (B) $\quad E = t_2 + t_3 \,;\; R_2 = S_2 \,;\; R_3 = S_3 \,;\; I_2 = \dfrac{1}{V_2} \,;\; I_3 = \dfrac{1}{V_3}$ (C) $\quad E = R_2 I_2 + R_3 I_3$

*INVENTOR.*
ALFRED C. WINTERHALTER
BY
ATTORNEYS

Aug. 26, 1958 A. C. WINTERHALTER 2,849,182
ANALOGUE COMPUTING AND PLOTTING DEVICE
Filed Oct. 13, 1954 3 Sheets-Sheet 2

INVENTOR.
ALFRED C. WINTERHALTER
BY
ATTORNEYS

Aug. 26, 1958  A. C. WINTERHALTER  2,849,182
ANALOGUE COMPUTING AND PLOTTING DEVICE
Filed Oct. 13, 1954  3 Sheets-Sheet 3

INVENTOR.
ALFRED C. WINTERHALTER
ATTORNEYS

United States Patent Office 2,849,182
Patented Aug. 26, 1958

2,849,182

ANALOGUE COMPUTING AND PLOTTING DEVICE

Alfred C. Winterhalter, Beaumont, Tex., assignor to Sun Oil Company, Philadelphia, Pa., a corporation of New Jersey Application October 13, 1954, Serial No. 462,005

6 Claims. (Cl. 235—61)

This invention relates to an analogue computing and plotting device designed for the solution of problems arising in seismic prospecting.

One of the problems involved in seismic prospecting work is the determination of boundaries between various formations. As examples, there are the problems of determining the boundaries of salt domes, weathered layers, etc. Seismic detector records give travel times of disturbances originating at shots to various detectors, and from these travel times boundaries may be calculated but the calculations are matters of considerable complexity and are time-consuming. For each particular wave path between a shot point and a detector there may be plotted a locus which satisfies the time-distance-velocity equation involved, the locus having the significance that some point thereof represents the point of the boundary through which the wave path passed. If a number of sufficiently closely adjacent loci are plotted, the boundary sought may be considered to be the envelope of the loci. The procedure of determining the loci, however, is time-consuming.

In accordance with the present invention, an analogue device is provided by which the loci may be readily plotted in the form of curves on a diagram scaled to the problem involved. Following the plotting of the loci, their envelope may be drawn in to give a sufficiently close approximation to the boundary sought.

The objects of the invention will become apparent from the following description, read in conjunction with the accompanying drawings, in which:

Figure 1 is a diagram illustrating the type of problem which may be solved through the use of the apparatus;

Figure 2 comprises a group of expressions explanatory of what is involved;

Figures 1, 2:
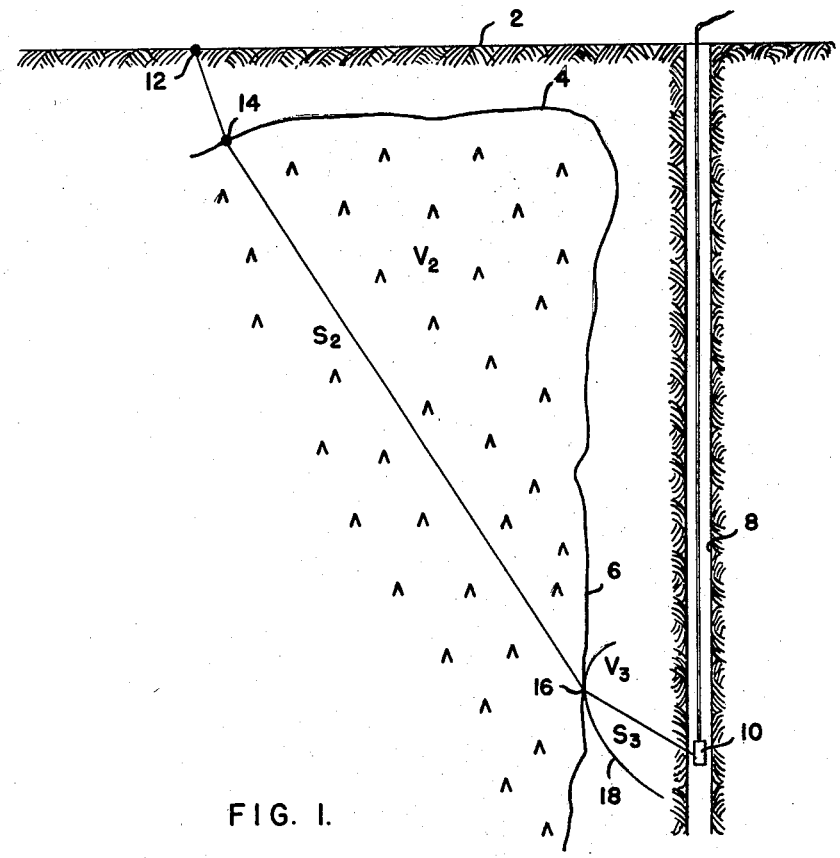

Reference may be made first to Figure 1 which illustrates the problem of determining the flank of a salt dome. The surface of the earth is indicated at 2, while the salt dome is indicated at 4. The flank 6 is to be determined. It may be assumed that outside the flank of the salt dome there has been drilled a test bore 8 in which there can be located at various levels a detector 10. A shot point is indicated at 12. The path of a disturbance originating at 12 and reaching the detector 10 is indicated by the broken path 12, 14, 16, 10, 14 and 16 being the respective points of entry into and emergence from the salt dome. What will be known from a single seismic record made by the detector 10 (following such corrections as may be necessary and which are made in accordance with known practices) will be the travel time from the shot point to the detector. Assuming that the top of the salt dome is fairly well defined as a result of prior seismic exploration or drilling, the travel time between points 12 and 14 will be known or can be calculated with sufficient accuracy and by subtracting this from the overall travel time the travel time between point 14 and the detector by way of an emergence point 16 will be known. The location of the point 14 will also be known, in general, with sufficient accuracy for the present work. The velocities of propagation of the seismic waves in the salt dome and in the vicinity of the detector 10 outside the salt dome will also generally be known to a sufficient degree of accuracy, the velocities in both of these regions being determinable by making travel time determinations for these regions. What is unknown is the location of the emergence point 16.

The travel time between point 14 and the detector, which is known, is related to the distances 14 to 16 (designated $S_2$) and the distance between the points 16 and 10 (designated $S_3$) and to the known velocities in the salt dome and the region around the detector, respectively designated $V_2$ and $V_3$, by the Equation A in Figure 2, $t_2$ plus $t_3$ being the travel time between 14 and 10 referred to as known. ($t_2$, the travel time between 14 and 16, is not separately known from $t_3$, the travel time between 16 and 10, but only the sum of these two is of interest.)

If $S_2$ and $S_3$ were plotted in Figure 1 to satisfy Equation A, there would be obtained the locus 18. If the entire operation was repeated with the detector 10 in different positions in the hole 8, a series of loci similar to 18 would be obtained and the flank 6 of the salt dome would, in the section involved, be given by the envelope of these loci. (Strictly speaking, each locus would be a surface rather than a curve, but it may be assumed from a standpoint of practical accuracy, that the problem is reduced to the plane passing through the axis of the borehole and the shot point.)

The plotting of the required loci is a matter of some difficulty, and in accordance with the present invention, an electromechanical analogue is provided by which the plotting may be reduced to a mere matter of manipulating a marking point while watching the readings of a voltmeter.

The electrical aspects of the analogue required will be evident by considering the substitutions indicated at B in Figure 2. Omitting, for simplicity, factors of proportionality, which are trivial from an explanatory standpoint, assume that for the travel time represented by $t_2$ and $t_3$ there is provided a potential E. Assume also that resistances $R_2$ and $R_3$ may be provided proportional to $S_2$ and $S_3$. Assume further that currents $I_2$ and $I_3$ may be provided which are respectively inversely proportional to the velocities $V_2$ and $V_3$. If these substitutions are made in Equation A, there will be obtained the Equation C.

Figure 3:
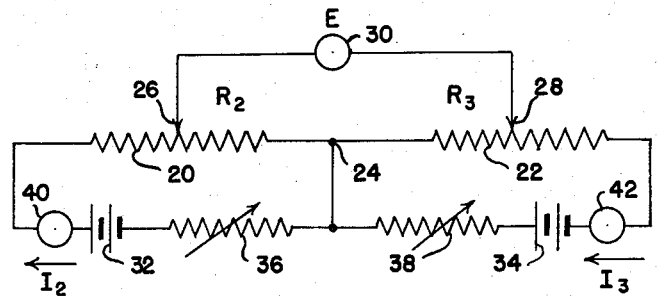
Figure 3 is a wiring diagram showing the electrical connections of the apparatus.
Figure 4:
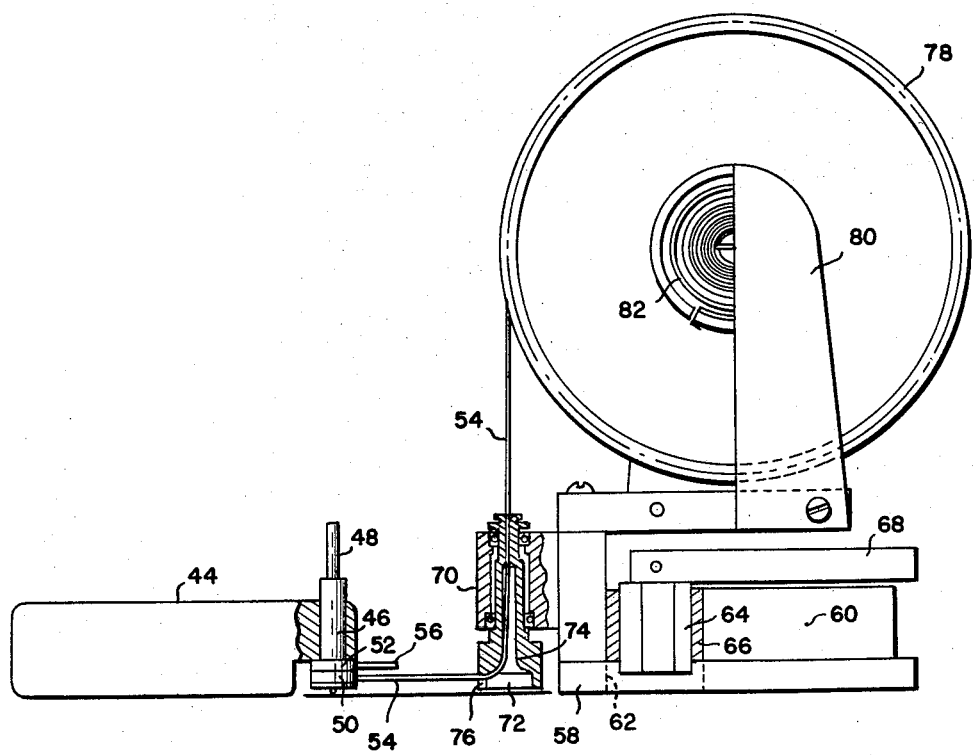
Figure 4 is an elevation, partly in section, showing a portion of the apparatus involved in its preferred form.
Figure 5:
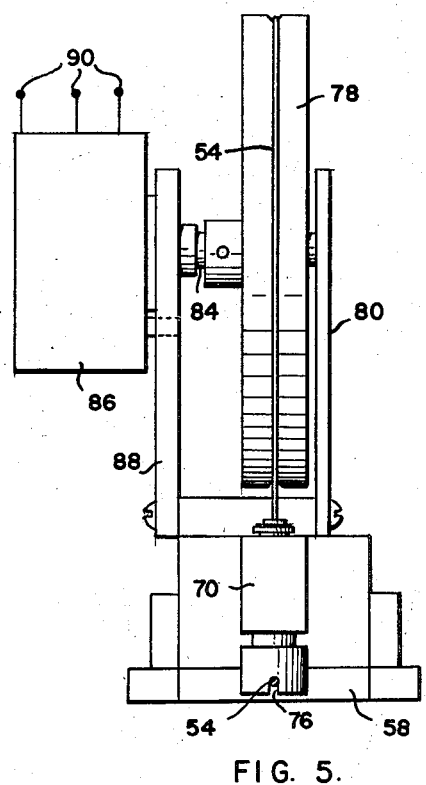
Figure 5 is an end elevation of a portion of this apparatus.

Figure 3 shows an electrical circuit which satisfies Equation C. A pair of potentiometers 20 and 22 are provided and are connected together at 24. The respective contacts 26 and 28 of these potentiometers are connected to the terminals of a voltmeter 30, the reading of which will be the potential E. Let it be assumed that these potentiometers are of linear type so that the resistances $R_2$ and $R_3$ existing between the junction 24 and the respective movable contacts 26 and 28 are proportional to the movements of these contacts. The resistances will correspond to $R_2$ and $R_3$ of Equation C. Current through the potentiometer 20 is provided by the series arrangement of battery 32, adjustable resistor 36 and ammeter 40. The current through potentiometer 22 is determined by battery 34, adjustable resistance 38 and ammeter 42. The currents thus provided correspond to $I_2$ and $I_3$ of Equation C and may be read on the ammeters. It will be evident that the circuit in Figure 3 satisfies Equation C. If the currents through the ammeters 40 and 42 are preset, the potentiometer contacts 26 and 28 could be so manipulated that the potential indicated at 30 would be constant. Considering, then, Equations A and C, it will be evident that the displacements of the potentiometer contacts may be made to correspond to $S_2$ and $S_3$ if currents $I_2$ and $I_3$ are caused to flow in proportion to the reciprocals of their corresponding velocities and if the manipulation of the potentiometer contacts is such as to maintain the value of potential E constant and correspondent to the sum of the travel times $t_2$ plus $t_3$. An analogue for the plotting of a locus such as 18 will then be provided if the arrangement is such that a plotting pencil point is movable so as to affect jointly resistances $R_2$ and $R_3$ to maintain the potential E constant. Reference may now be made to Figures 4 and 5 showing apparatus for attaining this end.

The apparatus illustrated is adapted to be located over a drawing similar to Figure 1. There is shown at 44 a manually movable block in a sleeve 46 in which there is located a pencil lead or other stylus 48. Concentrically mounted on the sleeve 46 are discs 50 and 52 in which are anchored cords 54 and 56. The discs being freely rotatable so that when the cords are tensioned their axes would, if produced, extend through the axis of the sleeve 46. The cords 54 and 56 are connected to identical assemblies of which only one need be shown and described, that connected to the cord 54.

The assembly just mentioned comprises a base 58 which is adapted to be held in fixed position, following adjustment to proper position, and this fixation is most simply accomplished by providing a working table of steel and producing the fixation through the use of a horseshoe magnet 60 the poles of which are extended at 62 to the surface of the paper which overlies the table. An armature for short-circuiting the magnetic circuit of the magnet is provided at 64 and is rotatable within a sleeve 66 by means of a lever 68. When the magnetic circuit of the horseshoe magnet is short-circuited, the base 58 is readily moved. When the armature is moved to a position to open the magnetic circuit the attraction involved will hold the base 58 to the table sufficiently to insure against accidental displacement from its adjusted position.

A bracket 70 on the base 58 provides a bearing for a spindle 72 which is provided with a suitable bore 74 for the passage approximately axially of the cord 54, the cord being guided laterally through a passage slot 76 so that, if its horizontal portion were produced, it would constantly pass through the axis of the spindle. The cord passes upwardly from the spindle and is wrapped about a drum 78 which is rotatably mounted in an upright bracket 80, there being provided a spiral spring 82 serving to urge the drum 78 in a direction to wind up the cord 54 and maintain it under tension. The shaft of the drum 78 is secured to the shaft 84 of a potentiometer 86 which is mounted on a bracket 88. The potentiometer 86, as mentioned above, is of linear type. Connections 90 pass to the electrical circuit elements as illustrated in Figure 3. The assembly associated with the cord 56 is identical with that just described, and the two potentiometers correspond, respectively, to 20 and 22 of Figure 3.

The arrangement is such that the displacements of the potentiometer contacts from the electrical end of their resistances which are joined at contact 24 is directly proportional to the spacing between the axis of the stylus 48 and the axis of the spindle 72. This spacing corresponds to $S_2$ or $S_3$ and the arrangement described results in the conditions required by the expressions in B. The operation of the apparatus is as follows:

The spindle 72 of one of the assemblies is aligned with the detector 10 of the scaled drawing. (This alignment may be provided to a high degree of accuracy by drawing about the location of detector 10 a circle having the same diameter as the outside diameter of the lower portion of the spindle 72 which may then be located directly above this circle.) The spindle 72 of the other assembly is similarly located in alignment with the point 14 at which it is assumed that the ray enters the top of the salt dome. Currents $I_2$ and $I_3$ are now adjusted to equality with (or proportionality to) the reicprocals of the respective velocities $V_2$ and $V_3$. In practice, the ammeter scales may be calibrated directly in terms of velocity. Following this, the stylus 48 is so moved that the reading of voltmeter 30 is maintained at the value corresponding to $t_2$ plus $t_3$. A curve is drawn with this condition satisfied, and this curve will then be the locus 18 previously referred to. That this is the case will be evident from the foregoing discussion and the equations.

Various other loci may then be similarly plotted utilizing the results from and the positions of the detector 10 resulting from its adjustment through the bore hole. When a sufficient number of these loci have thus been plotted, an envelope may be drawn tangent to all of them and this will be the profile 6 required.

It will be evident that other apparatus than that just described may be utilized including a linkage arrangement in which two links are pivoted together at the location of a stylus and are arranged to slide through supports located at points corresponding to 10 and 14 with adjustment of potentiometer contacts as such sliding takes place. The apparatus described, however, is much more desirable and more readily manipulated. It may be noted that the essential aspect of the apparatus is that the cords 54 and 56 define straight lines joining the stylus and the points corresponding to 14 and 10 and that they effect adjustments of potentiometers to give resistances which are proportional to the distances 14 to 16 and 10 to 16, respectively. It is to be understood, therefore, that the invention is not limited to the attainment of these conditions in the apparatus by means of the particular apparatus described.

Figure 6:
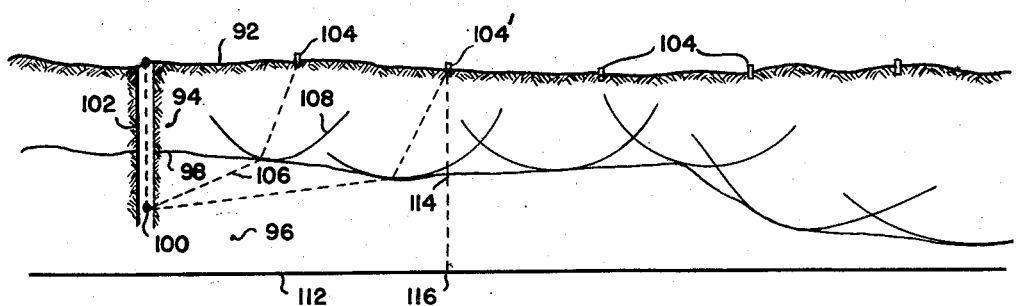
Figure 6 is a diagram illustrating the applicability of the invention to the problem of determining the contour of a weathered layer.

The identical fundamental problem described above is involved in the determination of the boundary between a weathered layer and underlying formation. The aspects of this problem are illustrated in Figure 6 in which 92 represents the surface, 94 is the weathered layer, and 96 is the underlying formation the boundary 98 between which and the weathered layer is to be ascertained. For this purpose, it is usual to fire an explosive charge at a location such as 100 below the weathered layer, the charge being located within a bore 102. Detectors 104 are located in an array extending from the upper end of the bore 102 and usually in a straight line so that the detectors and the axis of the bore hole are coplanar. It will be evident that if the spindles 72 of the apparatus previously described are located, respectively, at the location of the shot and at a detector, there may be plotted for a path such as 106 a locus such as 108 which satisfies Equation A. If loci such as this are plotted for all of the detector locations, there may then be drawn an envelope which will be the required weathered layer lower boundary 98.

In general, what is ultimately of interest is the correction to be applied with respect to each detector with reference to a datum plane such as 112, the correction being in the form of a time of transit of a disturbance between the datum plane and the detector due to the local condition of the weathered layer. The apparatus which has been described lends itself to this as illustrated in Figure 6. Assuming that the correction for a particular detector 104' is desired, one of the spindles 72 is located at the position of this detector and the other is located at a point on the datum plane which is vertically below the detector, i. e. the point 116. The stylus is located at 114 on the weathered layer boundary, the points 104', 114 and 116 being collinear. If now the currents $I_2$ and $I_3$ correspond, respectively, to the reciprocals of the velocities $V_2$ and $V_3$ in the weathered layer and below the weathered layer, between it and the datum plane, the potential reading on voltmeter 30 will give directly the time correction required for the particular detector. It will be evident, accordingly, that following the location of the weathered layer boundary, the apparatus may be immediately used to give the time corrections.

It will be evident that the invention is applicable to various other problems arising in seismisc work and to which there applies the Equation A.

What is claimed is:

1. Apparatus for use in seismic prospecting for the plotting of boundaries on a scaled drawing comprising elements locatable on such drawing to define three points thereof, members interconnecting one of said elements with both of the other two elements, a pair of potentiometers connected with said members and displaceable thereby to provide variable resistances respectively proportional to the distances between the first mentioned element and said other two elements, means providing adjustable currents through said resistances, and means indicating the sum of the RI drops through said resistances.

2. Apparatus for use in seismic prospecting for the plotting of boundaries on a scaled drawing comprising elements locatable on such drawing to define three points thereof, members interconnecting one of said elements with both of the other two elements, means for fixing the last mentioned elements in position on a drawing, a pair of potentiometers connected with said members and displaceable thereby to provide variable resistances respectively proportional to the distances between the first mentioned element and said other two elements, means providing adjustable currents through said resistances, and means indicating the sum of the RI drops through said resistances.

3. Apparatus for use in seismic prospecting for the plotting of boundaries on a scaled drawing comprising elements locatable on such drawing to define three points thereof, members comprising flexible cords interconnecting one of said elements with both of the other two elements, a pair of potentiometers connected with said members and displaceable thereby to provide variable resistances respectively proportional to the distances between the first mentioned element and said other two elements, means providing adjustable currents through said resistances, and means indicating the sum of the RI drops through said resistances.

4. Apparatus for use in seismic prospecting for the plotting of boundaries on a scaled drawing comprising elements locatable on such drawing to define three points thereof, members interconnecting one of said elements with both of the other two elements, means providing variable resistances respectively proportional to the distances between the first mentioned element and said other two elements, means providing adjustable currents through said resistances, and means indicating the sum of the RI drops through said resistances.

5. Apparatus for use in seismic prospecting for the plotting of boundaries on a scaled drawing comprising elements locatable on such drawing to define three points thereof, members interconnecting one of said elements with both of the other two elements, means for fixing the last mentioned elements in position on a drawing, means providing variable resistances respectively proportional to the distances between the first mentioned element and said other two elements, means providing adjustable currents through said resistances, and means indicating the sum of the RI drops through said resistances.

6. Apparatus for use in seismic prospecting for the plotting of boundaries on a scaled drawing comprising elements locatable on such drawing to define three points thereof, members comprising flexible cords interconnecting one of said elements with both of the other two elements, means providing variable resistances respectively proportional to the distances between the first mentioned element and said other two elements, means providing adjustable currents through said resistances, and means indicating the sum of the RI drops through said resistances.

References Cited in the file of this patent

UNITED STATES PATENTS 2,535,942    Lewis et al. _____ Dec. 26, 1950